United States Patent
Asakage et al.

(10) Patent No.: US 7,282,145 B2
(45) Date of Patent: Oct. 16, 2007

(54) OIL FILTER FOR CONSTRUCTION MACHINE

(75) Inventors: Tomohiko Asakage, Hiroshima (JP); Kazuhiko Fujii, Hiroshima (JP); Saburo Mori, Tokyo (JP); Tomoshige Tanaka, Tokyo (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 35 days.

(21) Appl. No.: 11/339,470

(22) Filed: Jan. 26, 2006

(65) Prior Publication Data

US 2006/0124533 A1  Jun. 15, 2006

Related U.S. Application Data

(62) Division of application No. 10/452,454, filed on Jun. 3, 2003, now abandoned.

(30) Foreign Application Priority Data

Jun. 21, 2002  (JP) .............................. 2002-182218

(51) Int. Cl.
*B01D 35/30* (2006.01)
(52) U.S. Cl. .................... 210/232; 210/323.2
(58) Field of Classification Search ................ 210/232, 210/323.2
See application file for complete search history.

(56) References Cited

U.S. PATENT DOCUMENTS

| | | | |
|---|---|---|---|
| 1,722,335 A | 7/1929 | Moorhouse | |
| 3,314,542 A | 4/1967 | Kudlaty | |
| 3,592,766 A | 7/1971 | Kudlaty | |
| 3,633,757 A | 1/1972 | Madern | |
| 4,105,562 A | 8/1978 | Kaplan et al. | |
| 4,517,085 A * | 5/1985 | Driscoll et al. ............. | 210/232 |
| 4,670,145 A * | 6/1987 | Edwards ................ | 210/321.87 |
| 4,869,820 A | 9/1989 | Yee | |
| 5,141,637 A | 8/1992 | Reed et al. | |
| 5,266,191 A | 11/1993 | Greene et al. | |
| 5,328,605 A | 7/1994 | Lin, Jr. | |
| 5,435,915 A | 7/1995 | Connors, Jr. | |
| 5,665,231 A | 9/1997 | Langsdorf et al. | |
| 6,391,193 B1 | 5/2002 | Luka | |
| 6,620,316 B1 | 9/2003 | Sakraschinsky et al. | |

FOREIGN PATENT DOCUMENTS

| | | |
|---|---|---|
| CN | 2224916 Y | 7/1996 |
| DE | 544 054 | 2/1932 |
| DE | 198 26 032 | 12/1999 |
| FR | 2 796 567 | 1/2001 |
| JP | 4-27881 | 5/1992 |
| JP | 6-41814 | 6/1994 |
| JP | 6-337007 | 12/1994 |

(Continued)

*Primary Examiner*—Terry K. Cecil
(74) *Attorney, Agent, or Firm*—Oblon, Spivak, McClelland, Maier & Neustadt, P.C.

(57) ABSTRACT

The prevent invention provides an oil filter comprising a filter element housed in a casing, the filter element being formed of two or more cylindrical element pieces piled on top of another in the height direction and attachably and detachably connected through connecting members. Accordingly, the efficiency in each of manufacture, stock control and storage of the filter element can be improved, and the cost can be also reduced.

1 Claim, 4 Drawing Sheets

FOREIGN PATENT DOCUMENTS

| | | |
|---|---|---|
| JP | 7-71606 | 8/1995 |
| JP | 2001-104723 | 4/2001 |
| JP | 2001-232116 | 8/2001 |
| KR | PS 0120304 | 11/1996 |
| WO | WO99/64133 | 12/1999 |
| WO | WO 00/51707 | 9/2000 |
| WO | WO 01/00296 A1 | 1/2001 |

* cited by examiner

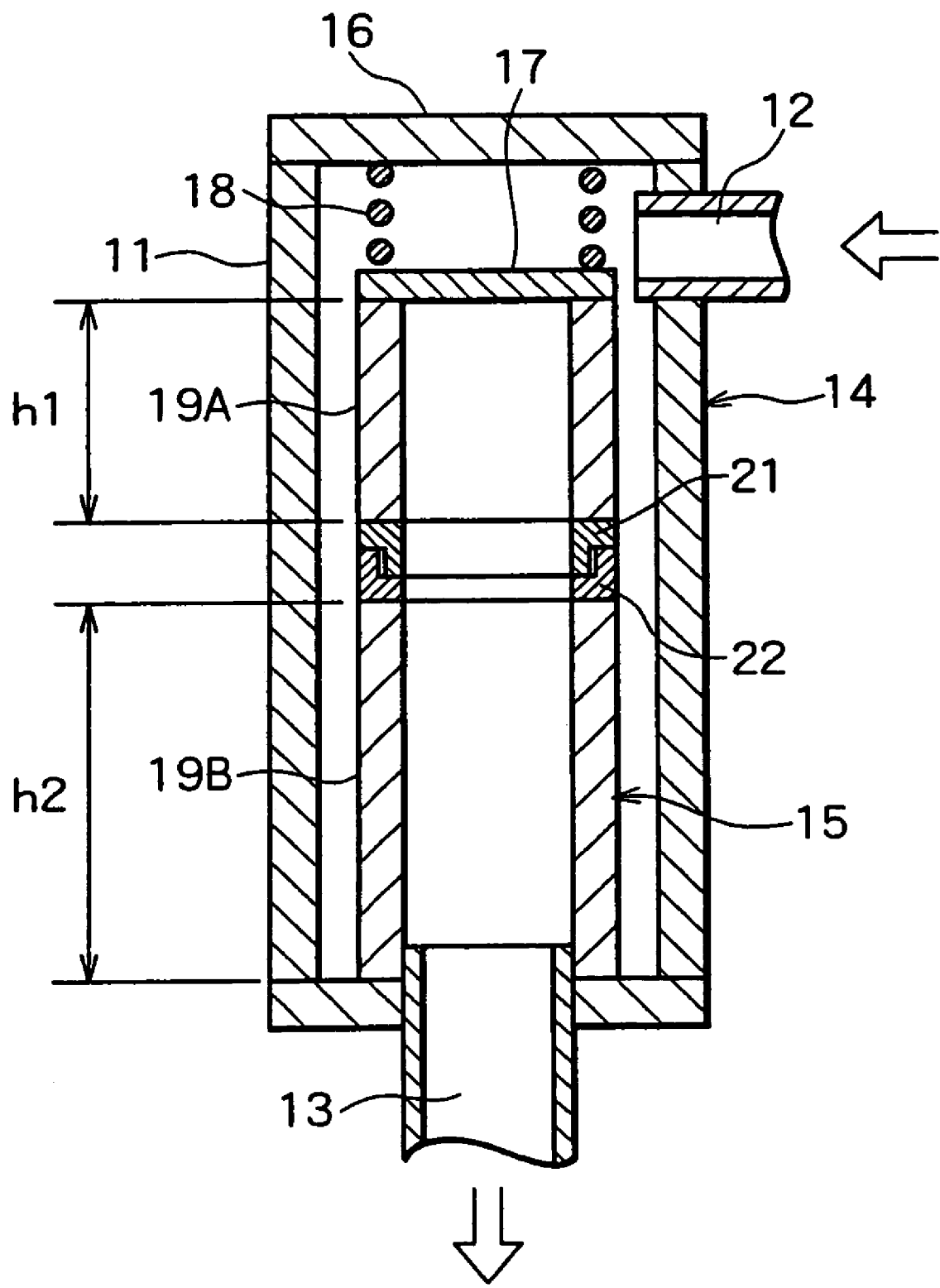

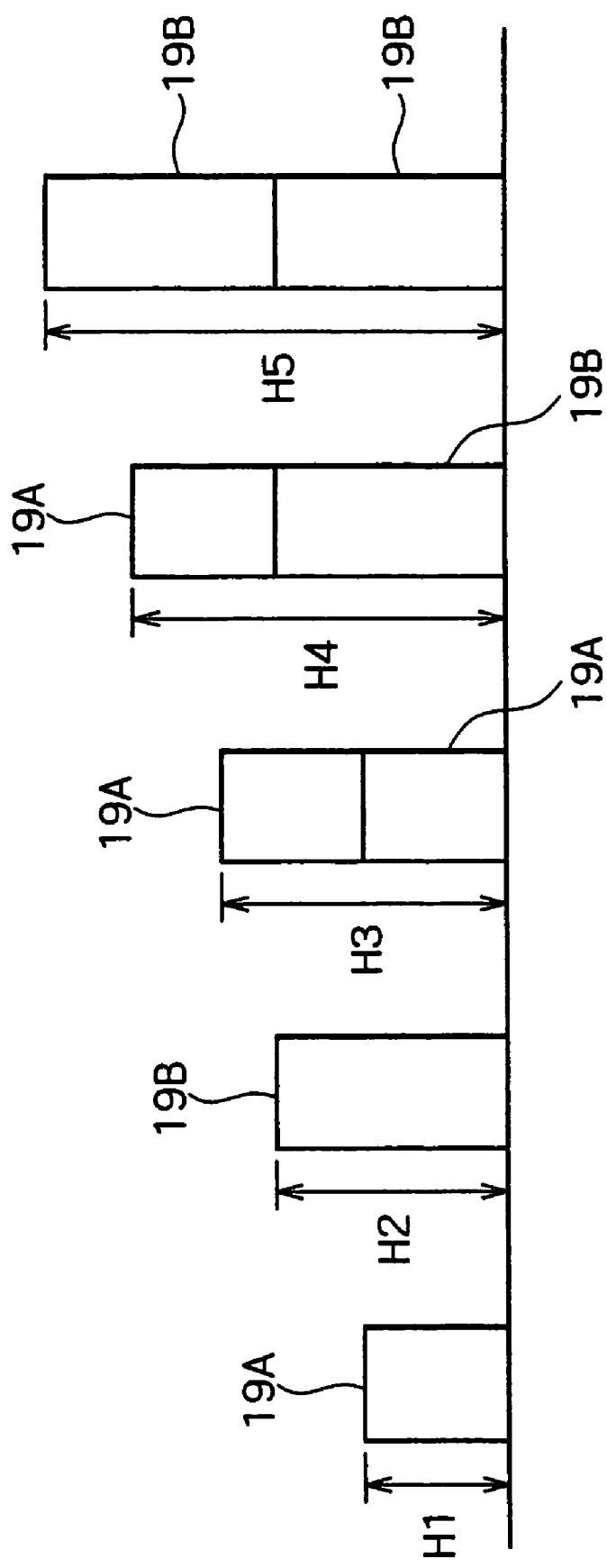

OIL FILTER FOR CONSTRUCTION MACHINE

This application is a divisional application of Ser. No. 10/452,454, filed Jun. 3, 2003, now abandoned, which is incorporated herein by reference.

BACKGROUND OF THE INVENTION

1. Field of the Invention

The present invention relates to an oil filter provided in a hydraulic circuit of a construction machine and an assembling method thereof.

2. Description of the Related Art

An oil filter is provided in a return circuit for returning a working fluid for driving the hydraulic actuator of a hydraulic excavator or the like, whereby dust or the like in the working fluid is removed to purify the working fluid. The flow rate of oil in a hydraulic circuit is varied depending on the size of excavator, so that filter elements of various sizes differed in filtration area are required depending on the flow rate.

Therefore, manufacturers had to manufacture various types of elements, and both manufacturers and users had to store various types of elements for replacement. This introduces a problem in stock control such as stock adjustment, in addition to an increase in manufacturing cost, because the shipping state is dispersed every type of elements. Further, the necessity of storing the filter elements by different part numbers every size causes the problem that the space efficiency of storage shelves is deteriorated, and the necessity of changing the storage space of storage shelves every element size leads to problems of poor storage efficiency and an increased storage cost.

SUMMARY OF THE INVENTION

The present invention thus has an object to provide an oil filter for a construction machine capable of improving efficiencies in the manufacture, stock control and storage of a filter element, and an assembling method thereof.

The oil filter for construction machine of the present invention is characterized by that a filter element is constituted by piling two or more element pieces on top of another in the height direction. This oil filter comprises a casing provided with an oil inflow port and an oil outflow port, and the filter element housed in the casing, and the filter element is formed of two or more element pieces piled on top of another vertically. The element pieces consist of single element pieces or a small variety of element pieces in size.

According to this, since various sizes of filter elements can be constituted by piling two or more element pieces on top of another vertically or in the height direction, the manufacture, stock control and storage of this filter element is facilitated more than in the past by much, and the efficiency in each of manufacture, stock control and storage can be remarkably improved to reduce the cost.

BRIEF DESCRIPTION OF THE DRAWINGS

FIG. 5 is a sectional view of an oil filter according to a second embodiment of the present invention: and FIGS. 6A-6E are views showing configuration examples of the filter element in the oil filter of the present invention.

DESCRIPTION OF THE PREFERRED EMBODIMENTS

The structure of the oil filter according to the first embodiment of the present invention will next be described in reference to FIGS. 1-6E. This structure is only one embodiment of the present invention, and the present invention is never limited thereby.

Figure 1:
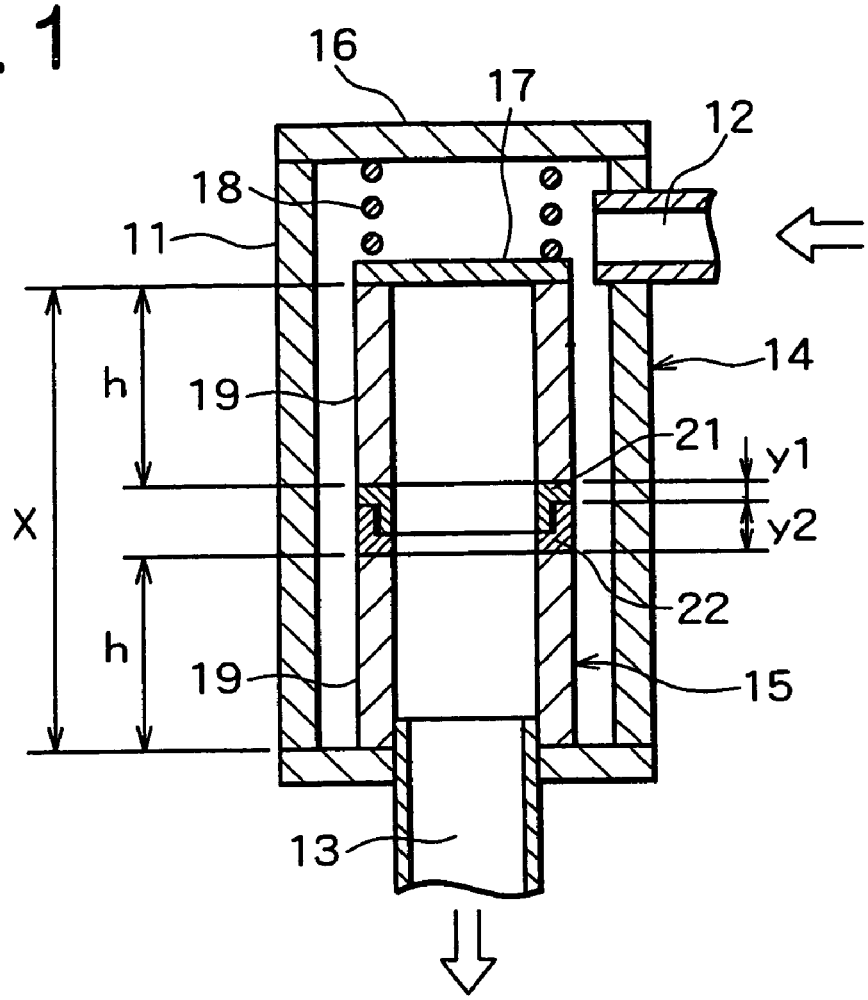
FIG. 1 is a sectional view of an oil filter according to a first embodiment of the present invention.
Figure 2:
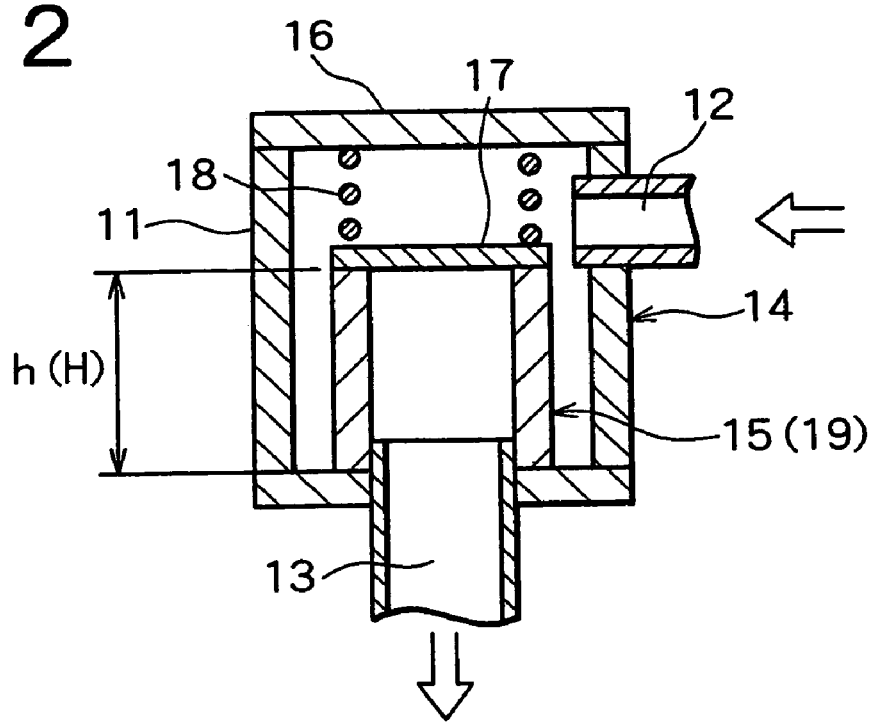
FIG. 2 is a sectional view of the oil filter of FIG. 1 wherein the filter element is formed of one element piece.
Figure 3:
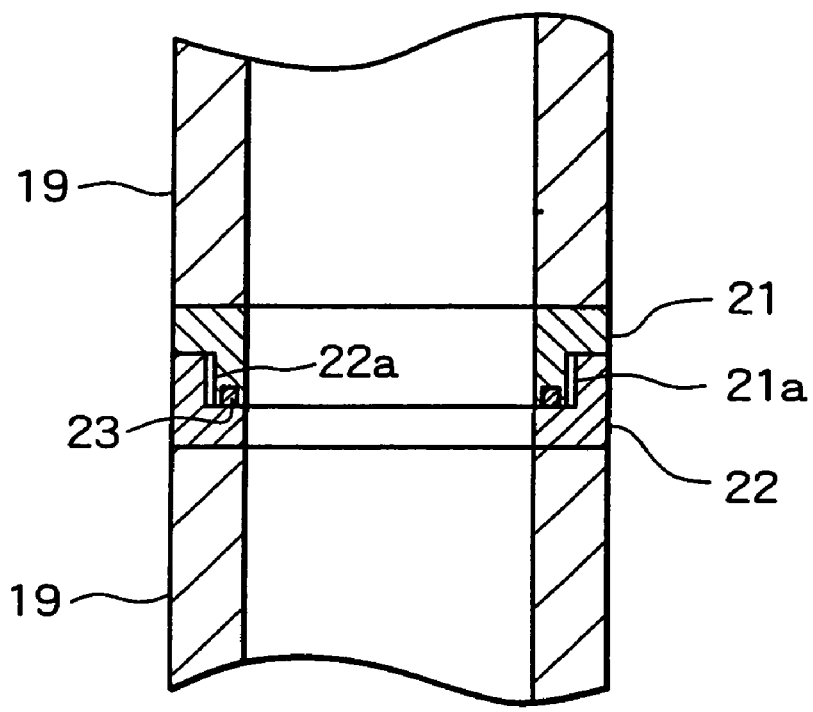
FIG. 3 is a partially enlarged view of FIG. 1.

First Embodiment (Refer to FIGS. 1-3)

In FIGS. 1 and 2, the oil filter of the first embodiment is constituted as follows. A casing 14 comprises a metallic cylindrical vessel 11 having an oil inflow port 12 as inlet provided on the side wall and an oil outflow port 13 as outlet provided on the bottom wall. A filter element 15 as a filter member formed of cellulose fiber, glass fiber or the like is housed in the casing 14. The element 15 is arranged so that its outside surface is located on the oil inflow side and the inside surface on the oil outflow side. The oil filtered and purified by the element 15 is discharged through the oil outflow port 13 provided in the bottom of the casing 14, and returned to an oil tank. The element 15 is arranged, as shown in FIG. 1, so as to cover the oil outflow port 13.

As the shape of the element 15, tubular and cylindrical shapes can be exemplified, but the shape is never limited by them.

In the same drawings, denoted at 16 is the lid of the casing 14, 17 is the lid of the filter element 15, and 18 is a spring exemplified as an elastic member provided between both the lids 16 and 17 to fix the filter element 15 in the casing 14.

In the oil filter shown in FIG. 1, the filter element 15 is constituted by piling two element pieces 19 of one type uniform in size (height dimension and diameter dimension) and in material on top of another in the height direction (vertical direction). Hereinafter, the description is made for the example using two element pieces, but the number of element pieces or the kind of materials are not limited by this. Of course, the filter element 15 can be constituted also by the single use of the element piece 19 as shown in FIG. 2 in case of small flow rate of oil.

Since the filter element 15 is constituted by using at least one or more of element pieces 19 of the same type, the manufacture, control and storage of the filter element 15 can be performed in unites of the element pieces 19.

In this case, the manufacture of only one type of element pieces 19 suffices for a manufacturer, and the filter element 15 can be assembled by piling a required number of them on top of another according to a desired filter element size. Of course, the single use of the element piece 19 might be sufficient depending on the desired size.

Further, the stock control and storage of only this type of element pieces 19 suffice for both manufacturers and users.

Accordingly, the manufacture, stock control and storage of the filter element 15 is facilitated by far, compared with at the time when it was manufactured, stock-controlled and stored every size. Therefore, the cost in each stage of manufacture, stock control and storage can be reduced, and efficiencies of stock control and storage are remarkably improved.

Figure 4:
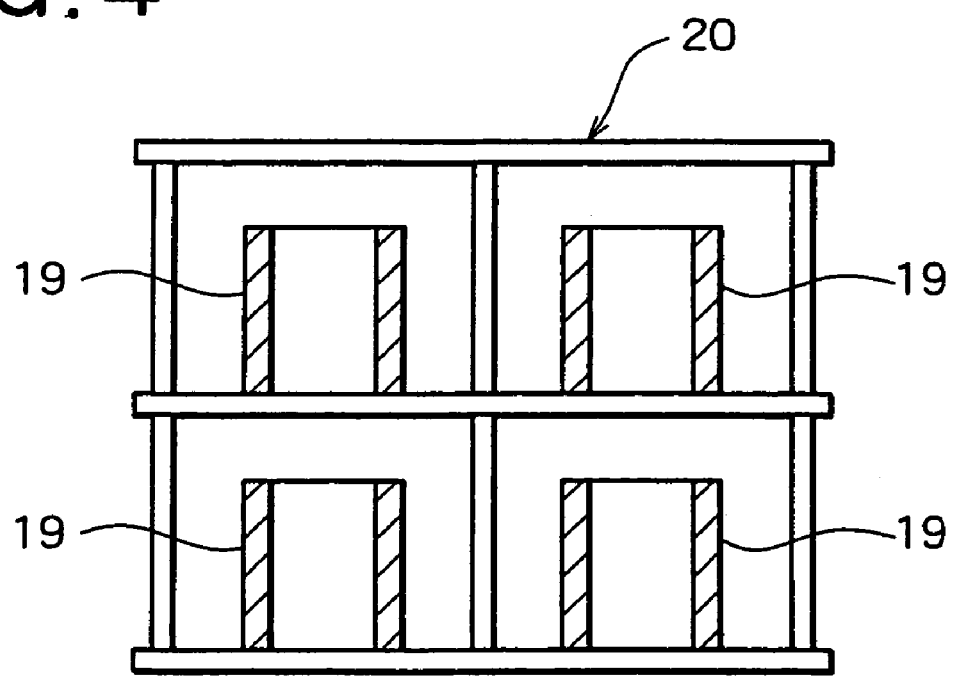
FIG. 4 is a sectional view showing the storage state of the element pieces constituting the filter element of the present invention.

In storage, for example, the element pieces 19 can be stored in a common storage shelf 20 fitted to the size of the element pieces 19 with a common part number attached thereto, as shown in FIG. 4. The storage space can be thus wisely used, and the troublesome sorting work by every size can be dispensed with. From the point of storage control, since there is no difference in shipping quantity every size as in the past, a trouble or risk for storage adjustment can be eliminated.

In the oil filter of FIG. 1, both the mutually piled element pieces 19 and 19 are attachably and detachably connected to each other through ring-like connecting plates 21 and 22 mounted on the respective connecting faces by caulking or the like.

Namely, as extendedly shown in FIG. 3, a male screw part 21$a$ is threaded on the upper connecting plate 21 mounted on the lower surface of the upper element piece 19, and a female screw part 22$a$ is threaded on the lower connecting plate 22 mounted on the upper end surface of the lower element piece 19. Both the element pieces 19 and 19 are attachably and detachably connected to each other through both the connecting plates 21 and 22 by the male and female screw parts 21$a$ and 22$a$.

The inner and outer diameter dimensions of both the connecting plates 21 and 22 are set equal to those of the element piece 19.

A ring-like seal member 23 is further provided on the lower surface of the upper connecting plate 21. This seal member 23 prevents the leak of oil from the screw joining part of both the connecting plates 21 and 22 (between both the element pieces).

The attachable and detachable connection of both the element pieces 19 and 19 provides the following effect. When the passing flow rate of oil is different between both the element pieces 19 and 19 by the positional relation between the oil inflow port 12 and oil outflow port 13 of the casing 14 to cause a difference in clogging state between both the element pieces 19 and 19, for example, both the element pieces 19 and 19 are separated once, and their positions are interchanged, whereby the clogging state can be equalized to improve the aggregative life of the filter element 15.

Since the both the element pieces 19 and 19 are screw-joined through the connecting plates 21 and 22, the assembling and separation of the filter element 15 can be easily performed only by screw fastening and loosening operations.

Further, since the connecting part is never protruded to the inside and outside of the element because of screw joining, there is no fear of the inhibition of oil flow by the connecting part.

In the structure of FIG. 1 where both the element pieces 19 and 19 are attachably and detachably connected to each other through the connecting plates 21 and 22, when the total height dimension of the filter element 15 is X, an effective height dimension for performing the filtration effect is H (not shown), the height dimension of both the element pieces 19 and 19 is h, and the height dimensions of the connecting plates 21 and 22 are y1 and y2, respectively, the following relational equations are established.

$$H=2h \quad (1)$$

$$X=2h+y1+y2 \quad (2)$$

Second Embodiment (Refer to FIGS. 5 and 6A-E)

In the second embodiment, the same reference mark is given to the same part as in the first embodiment to omit the duplicate description.

In the first embodiment, the effective height dimension H of the filter element 15 can be adjusted in an integral multiple of the height dimension h of the element piece 19. When it is necessary to further extend the range of size adjustment according to the flow rate of oil, the second embodiment is preferred.

In the second embodiment, as shown in FIG. 5, the filter element 15 is constituted by combining a proper number (one each in the drawing) of element pieces 19A and 19B of two types with differences in height dimension (h1, h2), wherein the element piece 19A is a small piece, and 19B is a large piece longer than 19A.

In this case, various sizes of filter elements can be constituted by use of only two types of element pieces 19A and 19B as shown in FIGS. 6A-6E. Namely, FIGS. 6A and 6B show structures consisting of single bodies of pieces 19A and 19B, respectively. FIG. 6C shows a structure by combination of two small pieces 19A, FIG. 6D shows a structure by combination of one small piece 19A and one large piece 19B (the example of FIG. 5), and FIG. 6E shows a structure consisting of only two large pieces 19B. Accordingly, five element sizes H1 (=h1), H2 (=h2), H3 (=h1×2), H4 (=h1+h2), and H5 (=h2×2) can be obtained at the lowest.

Therefore, the range of size adjustment can be extended by far, compared with the first embodiment.

The size or type of element pieces may be further increased so as to respond to more minute size requests within the range never impairing the merits in manufacture, stock control and storage.

The means for attachably and detachably connecting the element pieces piled on top of another is not limited to the male and female screw joining method by the connecting plates 21 and 22 described in the above embodiment. For example, flanges can be protrusively provided on both the connecting plates to be mounted on both the pieces within the range never inhibiting the oil flow to mutually bolt both the connecting plates in the flanges.

According to the present invention, as described above, various sizes of filter elements are constituted by using a single element piece or a small variety of element pieces and piling two or more element pieces on top of another in the height direction. Therefore, the manufacture, stock control and storage of the filter element are facilitated more than in the past by far, and the efficiency in each of manufacture, stock control and storage can be remarkably improved to reduce the cost.

Suitably, connecting plates of ring shape or the like are provided on the connecting faces of the element pieces, and the connecting plates are connected to each other in the respective screw parts.

Accordingly, since the element pieces are mutually attachably and detachably connected to each other, the element pieces are separated once, and their positions are interchanged when the passing flow rate of oil is different between both the pieces, for example, because of the positional relation between the oil inflow port and oil outflow port of the casing to cause a difference in the clogging state of each element piece, whereby the clogging state can be equalized to improve the aggregative life of the filter element.

Further, the element pieces may be joined to each other by male and female screws.

In this case, the assembling and separation are facilitated. Since both the connecting plates are connected in the mutual screw parts, the connecting part is never protruded to the circumference of the element. Therefore, there is no fear of the inhibition of oil flow by the connecting part.

Further, a seal member may be provided between the connecting faces of the element pieces.

In this case, the oil leak between the element pieces can be surely prevented in spite of the piling method.

An assembling method of oil filter according to the present invention comprises the following steps.

1) manufacturing one type of cylindrical element pieces uniform in size;

2) piling two or more element pieces on top of another in the height direction to constitute a filter element; and 3) housing the filter element in a casing provided with an oil inflow port and an oil outflow port to assemble an oil filter.

Another assembling method of oil filter according to the present invention comprises following steps.

1) manufacturing two or more types of cylindrical element pieces with differences in size;

2) piling at least two types of element pieces on top of another in the height direction to constitute a filter element; and 3) housing the filter element in a casing provided with an oil inflow port and an oil outflow port to assemble an oil filter.

One preferred embodiment of the present invention is disclosed above, but the scope of protection of the present invention is never limited thereby.

We claim:

1. An oil filter for a construction machine, comprising:

a cylindrical casing provided with an oil inlet and an oil outlet;

a removable lid provided on the casing;

an oil filter element housed in the casing, the oil filter element being formed of two or more hollow element pieces piled on top of one another vertically; and a plurality of ring shaped connecting parts for detachably connecting adjacent ones of the element pieces to each other, the connecting parts each comprising one of engaging male and female screw parts comprising threads and provided on each of said adjacent element pieces, wherein inside and outside diameters of the ring shaped connecting parts are substantially equal to the inside and outside diameters of the element pieces such that the connecting pieces do not protrude to the inside or outside of the element pieces when the element pieces are joined by screw joining of the connecting parts, wherein the oil inlet is disposed at an upper side of a top one of the element pieces and the oil outlet is disposed at a bottom side of the casing in such a manner that a bottom one of the element pieces covers the oil outlet, whereby oil flows from the oil inlet to the oil outlet.

* * * * *